(12) United States Patent  
Michael

(10) Patent No.: US 7,428,661 B2
(45) Date of Patent: Sep. 23, 2008

(54) TEST AND DEBUG PROCESSOR AND METHOD

(76) Inventor: Sam Michael, P.O. Box 12081, Millcreek, WA (US) 98082-0081

( * ) Notice: Subject to any disclaimer, the term of this patent is extended or adjusted under 35 U.S.C. 154(b) by 521 days.

(21) Appl. No.: 10/251,108

(22) Filed: Sep. 20, 2002

(65) Prior Publication Data

US 2003/0061020 A1   Mar. 27, 2003

Related U.S. Application Data

(60) Provisional application No. 60/324,240, filed on Sep. 21, 2001.

(51) Int. Cl.
 *G06F 11/00* (2006.01)
(52) U.S. Cl. .......................................... 714/27; 714/727
(58) Field of Classification Search ................. 714/727, 714/27
 See application file for complete search history.

(56) References Cited

U.S. PATENT DOCUMENTS

| | | | | | |
|---|---|---|---|---|---|
| 5,355,369 | A | * | 10/1994 | Greenberger et al. | 714/727 |
| 5,416,783 | A | * | 5/1995 | Broseghini et al. | 714/728 |
| 5,491,666 | A | * | 2/1996 | Sturges | 365/201 |
| 5,608,736 | A | * | 3/1997 | Bradford et al. | 714/727 |
| 5,673,274 | A | * | 9/1997 | Yoshida | 714/724 |
| 5,737,497 | A | * | 4/1998 | Ballard | 706/47 |
| 5,751,737 | A | * | 5/1998 | Lagrotta et al. | 714/727 |
| 5,761,489 | A | * | 6/1998 | Broseghini et al. | 712/227 |
| 5,828,825 | A | * | 10/1998 | Eskandari et al. | 714/27 |
| 5,898,704 | A | * | 4/1999 | Kawano | 714/727 |
| 6,122,762 | A | * | 9/2000 | Kim | 714/726 |
| 6,134,707 | A | * | 10/2000 | Herrmann et al. | 717/139 |
| 6,311,292 | B1 | * | 10/2001 | Choquette et al. | 714/30 |
| 6,370,665 | B1 | * | 4/2002 | Noguchi | 714/738 |
| 6,704,889 | B2 | * | 3/2004 | Veenstra et al. | 714/39 |
| 6,728,901 | B1 | * | 4/2004 | Rajski et al. | 714/30 |
| 6,928,638 | B2 | * | 8/2005 | Parvathala et al. | 717/124 |
| 7,078,929 | B1 | * | 7/2006 | Draper et al. | 326/16 |
| 7,102,780 | B2 | * | 9/2006 | Watanabe | 358/1.15 |
| 2002/0047723 | A1 | * | 4/2002 | Farkas et al. | 324/765 |
| 2002/0065646 | A1 | * | 5/2002 | Waldie et al. | 703/26 |

* cited by examiner

*Primary Examiner*—Scott T. Baderman
*Assistant Examiner*—Paul F. Contino

(57) ABSTRACT

A test and debug processor capable of initiating, commanding and executing JTAG-bus functions without the involvement of an external CPU. The processor includes a JTAG-bus controller with a JTAG port coupled to it. The JTAG-bus functions are encoded in instructions and stored in a memory structure. The processor instructions are then fetched and executed directly by the JTAG-bus controller without software interpretation. The instructions optionally includes JTAG-bus end state, function duration information, information about the location of the data to be sent out to the test object and a location to store the information received from the test object. Optionally, the test and debug processor can directly access any memory structure to fetch or store test data objects by adding a memory bus-controller interface to the processor. The ability to execute arithmetic and logic operation and register transfer operations on test data can be added using an ALU.

20 Claims, 2 Drawing Sheets

TEST AND DEBUG PROCESSOR AND METHOD

This application claims the benefit of U.S. Patent No. 60/324,240 filed on Sep. 21, 2001.

BACKGROUND OF THE INVENTION

1. Field of the Invention

This invention pertains to electronic devices used to test and debug electrical circuits and, more particularly, such devices that use a Joint Test Action Group (JTAG) port.

2. Description of the Related Art

With the complexity and increase of pin-count of new computer chips and the dense assembly of these chips on circuit boards, it becomes increasingly difficult to test and debug the circuit boards after being assembled. A group of leading electronic companies has joined forces and developed a standard test port to be built on every chip. The purpose of this test port is to allow connection to a test tool to check the value of each pin on the chip. Some chips add more functionality to this test port to provide access to virtually any resource inside the chip. One example of an in situ test port is the "JTAG" (Joint Test Action Group) test port adopted by the Institute of Electrical and Electronics Engineers, Inc, and defined as the IEEE standard 1149.1.

A common use of a test port is to test the components of a circuit board such as memory, Flash, Input/Output chips and the on-board CPU. The test port can also be used to test the solder joints and the functionality of some of the onboard chips, and to program FLASH memory chips.

Typically, the testing tool is connected to a host computer that is used to input information and display the test results. The testing tool includes an I/O interface that connects via a port, such as SCSI, serial, parallel or Ethernet to the host computer. Typically, the testing tool CPU is also connected to a test-bus controller chip that allows the testing tool CPU to access the test port. When the testing tool uses a JTAG test port, a JTAG bus controller with its own chip is used.

In situations where test speed is not important, the CPU can just toggle some I/O pins that are connected to the test port to emulate the port protocol. In another implementation the test tool can be built into an add-on card that connects directly to the host computer motherboard. In such implementations, the host computer CPU can also serve as the test tool CPU.

During testing procedures, called a SCAN in case of JTAG, the testing tool is used to deliver a stream of bits to the test circuit. Upon receiving the bits, the test circuit responds by sending back a response stream of bits. By examining the response stream of bits, the test tool and the host software can determine the state of the test circuit and whether, for example, there are shorts or open solder points in the test board.

The incoming and outgoing test bits are normally stored in the main memory of the testing tool. In a typical SCAN test, the CPU reads the data from the main memory and then writes it to the test-bus controller. Some test-bus controllers have an input and output FIFO that allow the CPU to read and write larger data blocks. A DMA (Direct memory access) device can be used, if the controller chip has DMA control signal, such as request and acknowledge. Also since the number of bits in a SCAN test can vary from one to thousands of bits, it has to be determined if programming the DMA controller would take more time then using the CPU to write the data directly to the test-bus controller.

The CPU must wait until the test-bus controller sends the outgoing data to the board under test. If incoming stream of data is expected, the CPU has to read it from the test-bus controller and store it for further analysis. Again, since the number of bits can vary between one and thousand of bits, it has to be determined if an interrupt scheme can be used to interrupt the CPU after the results are received since an interrupt overhead might take more time then waiting for the data. Even though the results can be stored in the CPU registers, if the results are sufficiently small (i.e. 32 bit or less), most software compilers will store the results in the main memory. The CPU uses standard logic operations such as OR, NOT or AND to check the results of the test. These test operations can be repeated as many times as needed to check the functionality of the board under test. The results can then be sent to the host computer to be displayed to the operator.

It should be understood that a substantial amount of time is wasted due to the relatively extensive communications between the test-tool CPU, the memory and the test-bus controller. There are three reasons for the slow communications.

First, because the test-bus controller is connected to the main CPU as a peripheral, the main CPU must supply the test-bus controller with instructions to execute a specific test. It might take the main CPU hundreds of assembly instructions to supply the test-bus controller with a test instruction (such as SCAN_IR in JTAG). Since current test-bus processors, as shown in FIG. 1, do not offer an instruction FIFO, the main CPU usually must wait until the current instruction is completed before supplying the next one. One of the major difficulties of adding an instruction FIFO is the need to synchronize the instruction FIFO with the data FIFO.

Secondly, because the test-bus controller cannot execute any logic operations, it has to wait for the main CPU to execute these operations to test the incoming data from the test board. Upon examination of the board results, the main CPU can give further instructions to the test-bus controller. With the current solution, it is difficult to add an Arithmetic-Logic Unit (hereinafter known as ALU) since the data is read and written in a FIFO, which cannot be addressed reliably since the data location in the FIFO depends on the speed of the main CPU and the speed of the test-bus connected to the test board.

Thirdly, because the test-bus controller cannot directly address and access the memory where the test data is stored, the main CPU (or a DMA channel) must act as the bridge between the test-bus controller and the memory where the test data is stored. Since the test-bus processor has to access different test vectors in a singe test, the CPU has to calculate the address for each one. This task is very time consuming. The reason that the test-bus controller cannot access the memory directly is because it does not have an address bus to address and access individual memory locations making it a memory-bus master.

SUMMARY OF THE INVENTION

It is an object of the present invention to provide a test and debug processor that can execute test instructions without the involvement of the main CPU.

It is another object of the present invention to provide such a test and debug processor in which the instructions are fetched from memory and executed directly by the processor.

It is a further object to provide such a test and debug processor that includes an integrally connected ALU that is able to execute arithmetic and logic functions needed for the test operations directly without the involvement of the main CPU.

These and other objects of the invention are met by a test and debug processor that includes a JTAG-bus controller with a JTAG port coupled thereto, a memory means capable of storing processor instructions, and an instruction encoding unit capable of fetching or requesting processor instructions from the memory means. The test-bus controller may also include an optional ALU and a memory-bus controller connected to the test-bus controller logic making it a bus master.

The difference between the current existing solution and the one purposed here is similar to the difference between a compiled and an interpreted code. In the prior art, the main CPU has to interpret the test code and then supply the test controller with the test data and instructions. In the disclosed invention, the CPU can execute the test code natively without the need for software running on the main CPU to interpret it.

The test and debug processor is designed to directly access any memory location. This spares the test application a lot of time since the main CPU does not have to keep shuffling data back and forth from the memory. So in a normal case where the main CPU has to calculate the address of the test object to be sent out, read it in to a register inside the CPU, read the address of the test-bus controller, and then write the data to the controller, the controller can directly read the data from memory in a single cycle and send it out via the test bus. The same process will occur when the test processor reads the data back from the test board and stores it in memory. So integrating the memory access logic into the test-bus controller saves a lot of time normally needed to access the data objects.

When the test and debug processor includes its own arithmetic-logic unit (ALU), the test data can be processed directly within the test processor without the need for an external CPU. For example if the test software needs to check if a bit is set in the data stream received from the test board, it can do this directly while the data being retrieved. In the current systems, the data has to be read by the main CPU and then tested. Since the CPU has to execute basic compare functions, the ALU can range from a simple comparator to any circuit that can execute complex arithmetic and/or logic operations.

Any of these features if integrated in the current solution will help increase the test speed. Combining all of these features in a single solution adds a lot of speed to the existing solution.

DESCRIPTION OF THE PREFERRED
EMBODIMENT (S)

Figure 1:
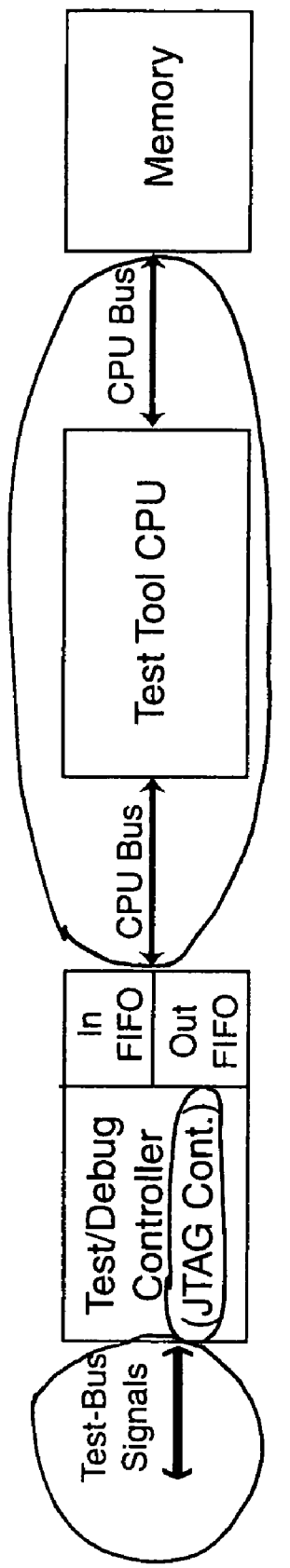
FIG. 1 is a schematic of a test and debug processor found in the prior art.
Figure 2:
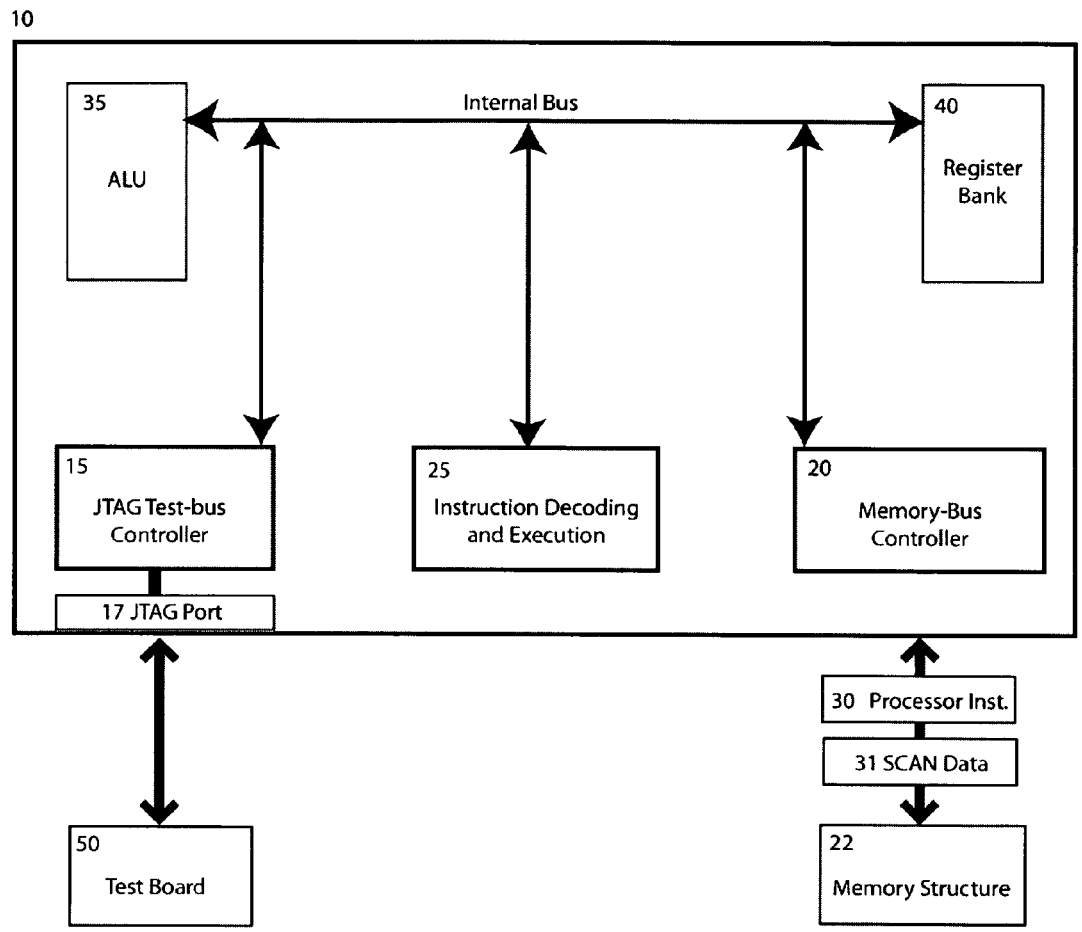
FIG. 2 is a schematic of the test and debug processor disclosed herein.

Referring to the accompanying FIG. 2, there is shown and described a test and debug processor 10 that can execute native test instructions. The processor 10 includes a JTAG-bus controller 15 with a JTAG port 17 coupled thereto, a memory means 20 or 22 capable of storing processor instructions 30 and scan data 31, and an instruction encoding unit 25 capable of fetching or requesting processor instructions from the memory means 20 or 22. The processor 10 may also include an optional ALU 35 and a memory-bus controller 48 connected to the JTAG-bus controller logic 15 making it a bus master. For example, in the case of a JTAG, the CPU can execute a SCAN_IR or SCAN_DR instruction directly after fetching it from memory. An example for such an instruction would be SIR R5, R6. This will let the CPU choose the SCAN_IR JTAG state and send all or part of the contents of register 5 (R5) to the test board. The data coming back from the test board will be stored in register 6 (R6). Another example would be scan 3 bits from the byte pointed to by register 2 and ignore the incoming data. The bit count for the scan operation can be supplied in the instruction, from a different register in the CPU or from main memory.

The instructions are fetched from a memory structure 22 such as random access memory (RAM) or supplied to the processor 10 via a FIFO memory (one instruction after another). The advantage of using random access memory is to allow the processor to jump instructions based on a test condition. A special software compiler can be used to generate the test code to run natively in the processor core.

This concept is different from just integrating a test-bus controller on the same chip as the processor 10 as it is common with serial and Ethernet interfaces. In the latter case the processor 10 will still have to address the device as an IO device. The only benefit for integrating the processor 10 with the IO port is to allow zero wait-state access to the device and save board space. Yet the processor 10 has still to access it as an IO device. In the case of this invention, the test-bus interface is addressable at the instruction level, which will be encoded and executed in the core. Once the processor 10 executes one of the test instructions (such as SCAN_IR in JTAG), the code execution can stop only if the result of this instruction is needed for a coming instruction. If the processor 10 hits another instruction while the test-bus logic is busy, the processor 10 has to halt until the test-bus is ready to execute a new instruction.

The processor 10 can directly access any memory location, with a resolution of a single bit, and send it to the test board. Also when the data is received from the test board 50, it can be stored in the memory directly without involving the main CPU. Also the memory can be used as a way of communication between the main CPU and the test processor. The ideal implementation is to make the memory dual-ported to allow both processors to access it at the same time. A portion of the memory area can be used as a communication channel to transfer messages between the two CPUs. A data FIFO can be also simulated in the dual ported memory either via soft or hardware. From the main CPU side, the memory can be addressed in a random way via address lines or can use a pointer to address a specific location. So if the main CPU needs to write a program into the test-processor memory, it can set the initial address and then keeps writing to a fixed port address. The internal pointers will then increment/decrement to point to the current memory address. This can make the test processor addressable as an IO device from the main CPU side.

If the processor 10 is used as the main CPU, it can be connected to an IO port (such as USB, Ethernet or PCI) to send and receive data directly with the PC used to display the test results. In another implementation, the test and debug processor 10 can have an i/o device such as a display and a keyboard to interface with the user.

Since the test-bus logic is connected to the processor internal buses, it can send and receive data directly to the ALU 35 to execute arithmetic and logic operations. This saves the time used to move the data between the test-bus controller, memory and the main CPU. Also the ALU 35 can add special logic functions needed to execute test operations faster. Such logic operations might be of less use in a normal CPU but are used heavily in test applications. One of such functions is the ability to switch between little and big endian memory formats (16, 32, 64 or 128 bit words). This is the way a CPU stores a data object that is longer than a byte. Some CPUs will store the Least Significant Byte (LSB) in a lower memory location followed by the Most Significant Byte (MSB). The big endian format will store the MSB in a lower memory location followed by the LSB. Some test and debug applications will need to switch between these formats while accessing memory of the board under test.

To demonstrate the functionality of the processor 10, a case is presented where the tester needs to write and verify some memory in a board under test. The tests consist of writing the pattern 0x55AAAA55 to a specific memory location and then verifying it. The tester is connected to the board using a JTAG interface. In order to write a memory location, the processor 10 has first to write the instruction register to choose the memory access data path. The write operation consists of sending a 1-bit instruction code (read=1/write=0), a 32-bit data word followed by a 32-bit address datum used to point to the memory word. The 32-bit long memory address must be incremented with every scan (+4). In a read operation, the tester has to send a dummy data word followed by the address of the word to be read. The tester will receive the data with the next scan when it is reading the next word (the read operation is always delayed by one word since the board under test must have time to access the memory).

In order to execute the writing operation, the processor 10 has to do the following scans. First, it must do a SCAN_IR to select the memory access path in JTAG with an end state of PAUSE_DR. To do so, it has to send a MEM_PATH value in a SCAN_IR command. Second, the test and debug processor 10 will execute a SCAN_DR command with a length of one bit to select the write command. The end state will also be PAUSE_DR. R1, R2 and R3 are 32-bit registers inside the processor under test. The processor 10 then will first scan R1, which contain the value 0x55AAAA55 into the chain. Following that, the processor 10 will scan R2, which includes the current memory address to be written. The end state for the last operation will be RUN_TEST_IDLE. After this operation, the processor 10 will add 4 to R2 to increment the memory address by 4 bytes and decrement R3, which contains the number of words to be written. If R3 is not zero, the cycle will be repeated with the first SCAN_DR.

In the verifying operation, the processor 10 will also execute the first SCAN_IR as before. Then it will scan the command bit to choose a read operation. Since the data field is invalid, it will be filled with 0. The processor 10 will then send R2 as an address value. The data received from the scan will be the one for the past memory access. The processor 10 will compare the data and report any error to the test software.

Below are the symbolic instructions that show the way to write such a program for the processor 10. We will assume that the number of accesses (test length) will be in register 7 (R7). R6 will store the memory address to start testing from.

Memory test code for example Board:

| | |
|---|---|
| MOVE R6,R2 | (R2 = Start address) |
| MOVE R7,R3 | (R3 = # of writes) |
| MOVE R1,TEST_VALUE | (R1 = 0x55AAAA55) |
| SIR MEM_PATH,0,4,PDR | (scan 4 bits with the MEM_PATH value in the instruction register and descard incoming data. Go to Pause_DR as an end state) |
| REP_WRITE: | (Write label) |
| SDR 0,0,1,PDR | (Scan one bit with value 0 for write instruction) |
| SDR R1,0,32,PDR | (Scan the data value) |
| SDR R2,0,32,RTI | (Scan the address value and go to Run_Test_Idel end state) |
| ADD R6,4,R6 | (increment memory address) |

-continued

| | |
|---|---|
| DEC R3 | (Decrement counter) |
| JNZ REP_WRITE | |
| MOVE R6,R2 | (R2 = Start address) |
| MOVE R7,R3 | (R3 = # of writes) |
| MOVE TEST_VALUE,R1 | (R1 = 0x55AAAA55) |
| SIRMEM_PATH,0,4,PDR | (scan 4 bits with value MEM_PATH in the instruction register. Go to Pause_DR as an end state) |
| SDR 1,0,1,PDR | (Scan one bit with value 1 for read instruction) |
| SDR 0,0,32,PDR | (Scan a dummy data value) |
| SDR R2,0,32,RTI | (Scan the address value and go to RTI end state) |
| ADD R2,4,R2 | |
| REP_VERIFY: | (Verify label) |
| SDR 1,0,1,PDR | (Scan one bit with value 1 for read instruction) |
| SDR 0,R3,32,PDR | (Receive the previous read value in Register 3) |
| SDR R2,0,32,RTI | (Scan the address value for next operation and go to RTI end state) |
| CMP R3, TEST_VALUE | (Compare result with test value) |
| JNE ERROR | |
| ADD R2,0x4,R2 | (increment memory address) |
| DEC R3 | (Decrement counter) |
| JNZ REP_VERIFY | |
| ERROR: | |
| MOV R5, DUMP_ADDRESS | (write R5 with the memory address used to show the error value to the main CPU) |
| MOV R2, (R5++) | (move R2 to the memory location pointer to by R5 and INC R5) |
| MOV R1, (R5++) | (move R1 to the memory location pointer to by R5 and INC R5) |
| STOP, E | (Stop with error flag for main CPU) |

As shown above, this processor 10 saves a lot of time during the test operation. Using a current solution, the communication overhead between the main CPU and the test-bus controller will dramatically decrease. This will decrease the execution time of such a test. Also, since the main CPU must be synchronized with the test-bus controller, it has to check its FIFO status and command completion status after each command.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A test and debug processor, comprising:
   a. a JTAG-bus controller capable of controlling JTAG states and signals, commanding JTAG state changes and initiating JTAG instruction scans and JTAG data scans;
   b. a JTAG port coupled to said JTAG-bus controller enabling said JTAG-bus controller to attach to, control and access electronic devices;
   c. means to access a memory structure capable of storing instructions executable by said processor; and,
   d. an instruction decoding unit connected to said JTAG-bus controller capable of receiving, fetching or requesting instructions from said memory structure and of forwarding said instructions for execution to said JTAG-bus controller;

wherein said processor instructions specify functions to be executed by the attached JTAG-bus controller; said processor instructions are directly executable by said JTAG-bus controller as read from the memory structure without the need to use any additional components to interpret such instructions prior to forwarding them to the JTAG-bus controller.

2. The test and debug processor, as recited in claim 1, further including an ALU connected to said instruction decoding unit able to execute arithmetic and logic instructions.

3. The test and debug processor, as recited in claim 1, further having a built-in memory bus controller enabling addressing and accessing of memory devices.

4. The test and debug processor, as recited in claim 1, further including a register bank to allow fast access of data.

5. The test and debug processor, as recited in claim 1, wherein said instruction decoding unit decodes processor instructions each of which provides one or more of the following information: functions to be initiated by the attached JTAG-bus controller, a JTAG end state information to indicate the JTAG state after executing JTAG functions, count information to indicate the cycle count of JTAG functions, data source information specifying the location for the outgoing data to the JTAG bus, and data destination information specifying a location to store the incoming data from the JTAG bus.

6. The test and debug processor, as recited in claim 1, wherein said instruction decoding unit is capable of decoding arithmetic logic instructions and forwarding them to an attached Arithmetic-Logic-Unit (ALU) for execution.

7. The test and debug processor, as recited in claim 1, wherein said instruction decoding unit is capable of decoding and executing register transfer instructions.

8. The test and debug processor, as recited in claim 1, wherein said instruction decoding unit is capable of decoding and executing memory transfer instructions.

9. The test and debug processor, as recited in claim 1, further able of executing more than one processor instruction consecutively.

10. The test and debug processor, as recited in claim 1, further including an integrated memory block capable of storing instructions executable by said processor and data where said processor can access any memory location in a random order.

11. A test and debug processor, comprising:
a. a JTAG-bus controller capable of controlling JTAG states and signals, commanding JTAG state changes and initiating JTAG instruction scans and JTAG data scans;
b. a JTAG port coupled to said JTAG-bus controller enabling said JTAG-bus controller to attach to, control and access electronic devices;
c. memory access logic for accessing a memory structure capable of storing instructions executable by said processor;
d. an instruction decoding unit capable of receiving, fetching or requesting instructions from said memory structure, decoding and forwarding said instructions for execution to the attached JTAG-bus controller; said instruction decoding unit decodes instructions each of which provides one or more of the following information: functions to be initiated by the attached JTAG-bus controller, a JTAG bus end state to indicate the JTAG state after executing JTAG functions, count information to indicate the cycle count of JTAG functions, data source information specifying the location to retrieve the outgoing data to the JTAG bus, and data destination information specifying a location to store the incoming data from the JTAG bus.

12. The test and debug processor, as recited in claim 11, further having an integrated register bank and a built-in memory bus controller enabling addressing and accessing of memory devices; wherein the instruction decoding unit is also capable of decoding and executing register transfer instructions and memory transfer instructions.

13. The test and debug processor, as recited in claim 11, further including an ALU connected to said instruction decoding unit enabling the processor to execute arithmetic and logic instructions; wherein the instruction decoding unit is also capable of decoding arithmetic and logic instructions and forwarding them to the attached Arithmetic-Logic-Unit (ALU) for execution.

14. A method of executing JTAG scan functions, the method comprising:
a. encoding a plurality of processor instructions in electronically accessible format, each of which provides one or more of the following information: functions to be initiated by a JTAG-bus controller, count information to indicate the cycle count of JTAG functions, information of the JTAG end-state after executing JTAG functions, data source information specifying the location to retrieve the outgoing data to the JTAG bus, and data destination information to specify a location to store the incoming data from the JTAG bus; wherein said processor instructions are encoded in such a way to be receivable or fetchable and executable by a hardware logic circuit without the use of a software interpreter; and,
b. selecting a test and debug processor comprising a JTAG-bus controller capable of controlling JTAG states and signals, commanding JTAG-state changes and initiating JTAG instruction scans and JTAG data scans, a JTAG port coupled to said JTAG-bus controller enabling said JTAG-bus controller to attach to, control and access electronic devices and an instruction decoding unit connected to said JTAG-bus controller, said instruction decoding unit capable of receiving, fetching or requesting said encoded processor instructions, decoding and forwarding said instructions for execution to the attached JTAG-bus controller.

15. A method of testing and debugging an electrical device, the method comprising:
a. selecting a test and debug processor that includes a JTAG-bus controller capable of controlling JTAG states and signals, commanding JTAG-state changes and initiating JTAG instruction scans and JTAG data scans, a JTAG port coupled to said JTAG-bus controller enabling said STAG-bus controller to attach to and access electronic devices, a means for accessing a memory structure capable of storing instructions executable by said processor, and an instruction decoding unit capable of receiving, fetching or requesting said processor instructions from said memory structure and of forwarding said instructions for execution to said JTAG-bus controller; wherein said processor instructions specify functions to be executed by the attached JTAG-bus controller, said processor instructions are directly executable by said JTAG-bus controller as read from the memory structure without the need to use any additional components to interpret such instructions prior to forwarding them to the STAG-bus controller;
b. selecting an electrical device compatible with and accessible by said JTAG port;

c. connecting said JTAG-bus controller to said electrical device using said JTAG port; and, d. operating said test and debug processor to test or debug said electrical device by sending said processor instructions for storage in said memory structure and executing said processor instruction by said test and debug processor.

16. A method of executing JTAG scan functions, the method comprising:

a. selecting a test and debug processor that includes a JTAG-bus controller capable of controlling JTAG states and signals, commanding JTAG state changes and initiating JTAG instruction scans and JTAG data scans, a JTAG port coupled to said JTAG-bus controller enabling said JTAG-bus controller to attach to, control and access electronic devices, a means for accessing a memory structure capable of storing instructions executable by said processor, and an instruction decoding unit capable of receiving, fetching or requesting said processor instructions from said memory structure and of forwarding said instructions for execution to said JTAG-bus controller; wherein said processor instructions specify functions to be executed by the attached JTAG-bus controller; said processor instructions are directly executable by said JTAG-bus controller as read from the memory structure without the need to use any additional components to interpret such instructions prior to forwarding them to the JTAG-bus controller;

b. encoding a plurality of processor instructions executable by said test and debug processor; and, c. executing said JTAG functions by sending said processor instructions for storage in said memory structure and executing said processor instruction by said test and debug processor.

17. A test and debug controller, comprising:

a. a JTAG-bus controller logic capable of receiving and executing instructions to initiate JTAG scans, and JTAG state changes;

b. a JTAG port coupled to said JTAG-bus controller logic enabling said JTAG-bus controller to attach to other external JTAG-bus controller devices; said external JTAG-bus controller devices are capable of executing JTAG scan functions as commanded by the test and debug controller via said JTAG port; said external JTAG-bus controller devices are neither a part nor essential for the operation of the test and debug controller;

c. means to access a memory structure;

wherein said test and debug controller is capable of accessing, controlling and commanding JTAG scan operations and JTAG state changes of the external JTAG-bus controller devices connected to the JTAG port of said test and debug controller; the instructions received by said test and debug controller include optional addressing information used to address and access random locations of the attached memory structure to store and retrieve data used for scan operations.

18. The test and debug controller of claim 17 further having an attached register bank with one or more registers capable of receiving and storing addressing information to address the attached memory structure.

19. The test and debug controller of claim 17 wherein the addressing values used to address the memory structure can increment or decrement after each memory access.

20. The test and debug controller of claim 17 wherein the memory structure is dual-ported and can be addressed and accessed by an external device in a random order.

* * * * *